(12) United States Patent
Lee et al.

(10) Patent No.: US 6,296,333 B1
(45) Date of Patent: Oct. 2, 2001

(54) VENTILATION OF DESKTOP WORKSTATION

(75) Inventors: Milton C. Lee, Mountain View; Philip G. Yurkonis, Campbell, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/233,292

(22) Filed: Jan. 19, 1999

(51) Int. Cl.[7] .................................................. A47B 97/00
(52) U.S. Cl. ................................ 312/223.2; 312/265.6; 361/724
(58) Field of Search .......................... 312/223.1, 223.2, 312/265.5, 265.6, 236, 293.3, 210, 213, 7.2; 211/26; D14/100, 102; 361/724, 725, 683, 685; 348/836, 839; 454/184

(56) References Cited

U.S. PATENT DOCUMENTS

| | | | |
|---|---|---|---|
| D. 408,797 | * | 4/1999 | Yeh et al. .............................. D14/102 |
| D. 417,441 | * | 12/1999 | Massaro et al. ...................... D14/100 |
| D. 425,879 | | 5/2000 | Lee et al. ............................. 14/115 D |
| D. 426,198 | | 6/2000 | Lee et al. ............................. 14/102 D |
| 3,192,306 | * | 6/1965 | Skonnord .......................... 312/213 X |
| 4,964,017 | | 10/1990 | Jindrick et al. ....................... 361/683 |
| 5,169,218 | * | 12/1992 | Chu .................................... 312/223.2 |
| 5,235,493 | * | 8/1993 | Yu ................................. 312/223.2 X |
| 5,392,192 | | 2/1995 | Dunn et al. .......................... 361/683 |
| 5,397,176 | | 3/1995 | Allen et al. ......................... 312/223.2 |
| 5,417,012 | * | 5/1995 | Brightman et al. ........... 312/223.2 X |
| 5,447,367 | | 9/1995 | Wei .................................... 312/223.2 |
| 5,513,068 | | 4/1996 | Girard .................................. 361/685 |
| 5,514,036 | * | 5/1996 | Lin ........................................ 454/184 |
| 5,542,757 | * | 8/1996 | Chang .............................. 361/724 X |
| 5,547,272 | * | 8/1996 | Paterson et al. ................... 312/223.2 |
| 5,568,611 | | 10/1996 | Khatri et al. .................. 312/223.2 X |
| 5,587,877 | | 12/1996 | Ryan et al. .......................... 361/683 |
| 5,590,938 | * | 1/1997 | De Andrea ....................... 312/236 X |
| 5,593,219 | * | 1/1997 | Ho ................................... 361/724 X |
| 5,699,132 | * | 12/1997 | Adachi et al. ....................... 348/836 |
| 5,768,097 | * | 6/1998 | Jelinger ................................ 361/683 |
| 5,820,235 | * | 10/1998 | Tsai .................................. 312/223.2 |
| 5,825,626 | * | 10/1998 | Hulick et al. .................. 312/265.6 X |
| 5,884,988 | * | 3/1999 | Foo et al. .......................... 312/223.2 |
| 5,896,273 | | 4/1999 | Varghese et al. .................... 361/724 |
| 5,947,570 | * | 9/1999 | Anderson et al. ................ 312/223.2 |
| 5,975,659 | * | 11/1999 | Yang et al. ........................ 312/223.2 |
| 6,053,586 | | 4/2000 | Cook et al. ........................ 312/223.2 |
| 6,055,152 | | 4/2000 | Felcman et al. ..................... 361/683 |
| 6,061,237 | | 5/2000 | Sands et al. ......................... 361/695 |

FOREIGN PATENT DOCUMENTS

| | | | |
|---|---|---|---|
| 0 425 170 | 5/1991 | (EP) . | |
| 2255674 | 11/1992 | (GB) . | |
| 2262388 | * 6/1993 | (GB) | .................................... 361/724 |
| 94/18618 | 8/1994 | (WO) . | |
| 96/02031 | 1/1996 | (WO) . | |

* cited by examiner

Primary Examiner—Peter M. Cuomo
Assistant Examiner—James O. Hansen
(74) Attorney, Agent, or Firm—Conley, Rose & Tayon, PC; B. Noël Kivlin

(57) ABSTRACT

A casing for electronic, heat-emitting components, has a front provided with an ornamented bezel. Instead of a conventional ventilation grill in such front bezel, the bezel is bowed outwardly relative to the front edges of the sides of the casing. Ventilation is provided through the gaps between the back of the bezel and the front edges of the sides. The upper portion of the bezel may be formed with an opening to receive a media bezel having openings therein for removable disk drives, floppy disks and the like.

20 Claims, 3 Drawing Sheets

VENTILATION OF DESKTOP WORKSTATION

BACKGROUND OF THE INVENTION

1. Field of the Invention

This invention relates to new and improved ventilation of a desktop workstation. More particularly the invention relates to ventilation of the workstation by curving the bezel on the front of the casing on the work station so that there is a gap between the bezel and the front edges of the sides of the casing.

2. Related Art

Workstations are frequently provided with bezels on the front thereof formed with apertures for ventilation purposes. A conventional fan within the workstation casing draws air through openings in the front face of the bezel so that there is an appreciable amount of noise caused by the airflow. The present invention is distinguishable from such prior constructions in that the bezel is bowed outward so there is a gap on the sides of the casing through which ventilation air enters the casing. This achieves considerable acoustic benefit.

SUMMARY OF THE INVENTION

A generally rectangular "desktop" type casing for a workstation or other electronic device contains heat-emitting components. A fan located within the casing draws air through the front and out through the back or the rear portions of the sides of the casing. An ornamental bezel closes off the front of the casing. At least portions of the bezel are curved outwardly so that there are gaps between the front edges of the sides of the casing and the bezel through which ventilation air may be drawn. The absence of airflow through the front is of acoustic benefit and the area of the opening into the interior of the casing is not reduced, as is the case in conventional bezels.

Acoustic absorbing foam may be applied to the back of the bezel so that if there is any tendency for air to reverse flow out through the bezel it is absorbed by the foam. The acoustic padding also absorbs some of the noise of the fan located inside the casing.

One of the features of the invention is the fact that the bezel is readily installed and removed. Only two screws are required and the screws themselves are concealed by a media bezel which is installed in the main bezel.

Openings are formed in the front face of workstations for insertion of disk drives, floppy disks and the like. Customarily there are openings in the front for what may be termed "media" accessories. The present main bezel is formed with an opening at the top to receive a media bezel. The ease of attachment of the media bezel is one of the features of the invention. As has also been mentioned, the placement of the media bezel conceals the screws which attach the main bezel to the casing.

BRIEF DESCRIPTION OF THE DRAWINGS:

The accompanying drawings, which are incorporated in and form a part of this specification, illustrate embodiments of the invention and, together with the description serve to explain the principles of the invention.

DETAILED DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Casing 11 for a workstation of other enclosure for heat-emitting electronic components has opposed sides 12 having front edges 13 here shown zig-zagged. It will be understood that the contour of edges 13 is subject to variation. The front of the casing 11 rearward of edges 13 may be formed with a front grill 14 of any desired shape.

Figure 1:
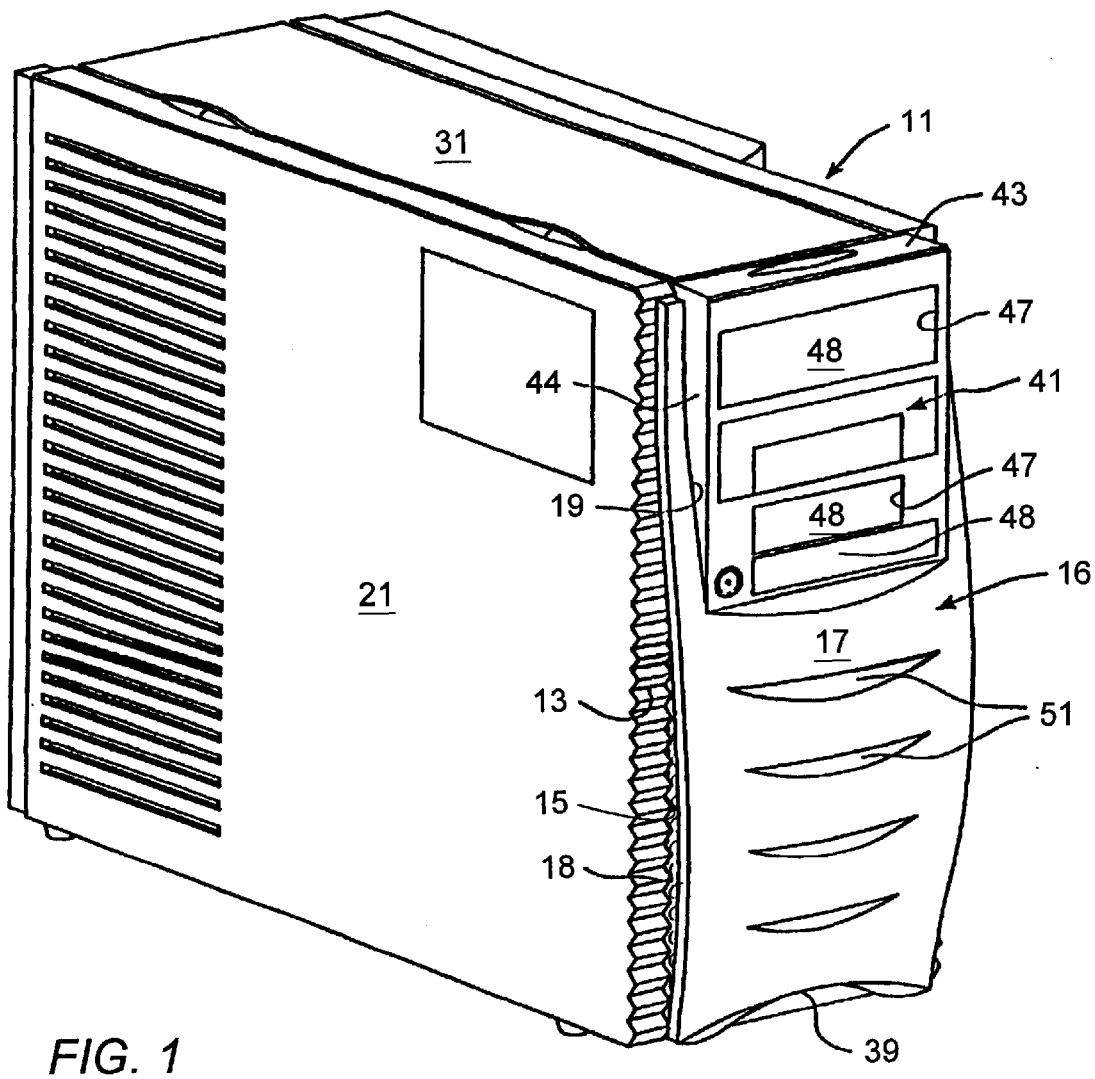
FIG. 1 is a perspective view showing the present invention installed in a conventional workstation.
Figure 2:
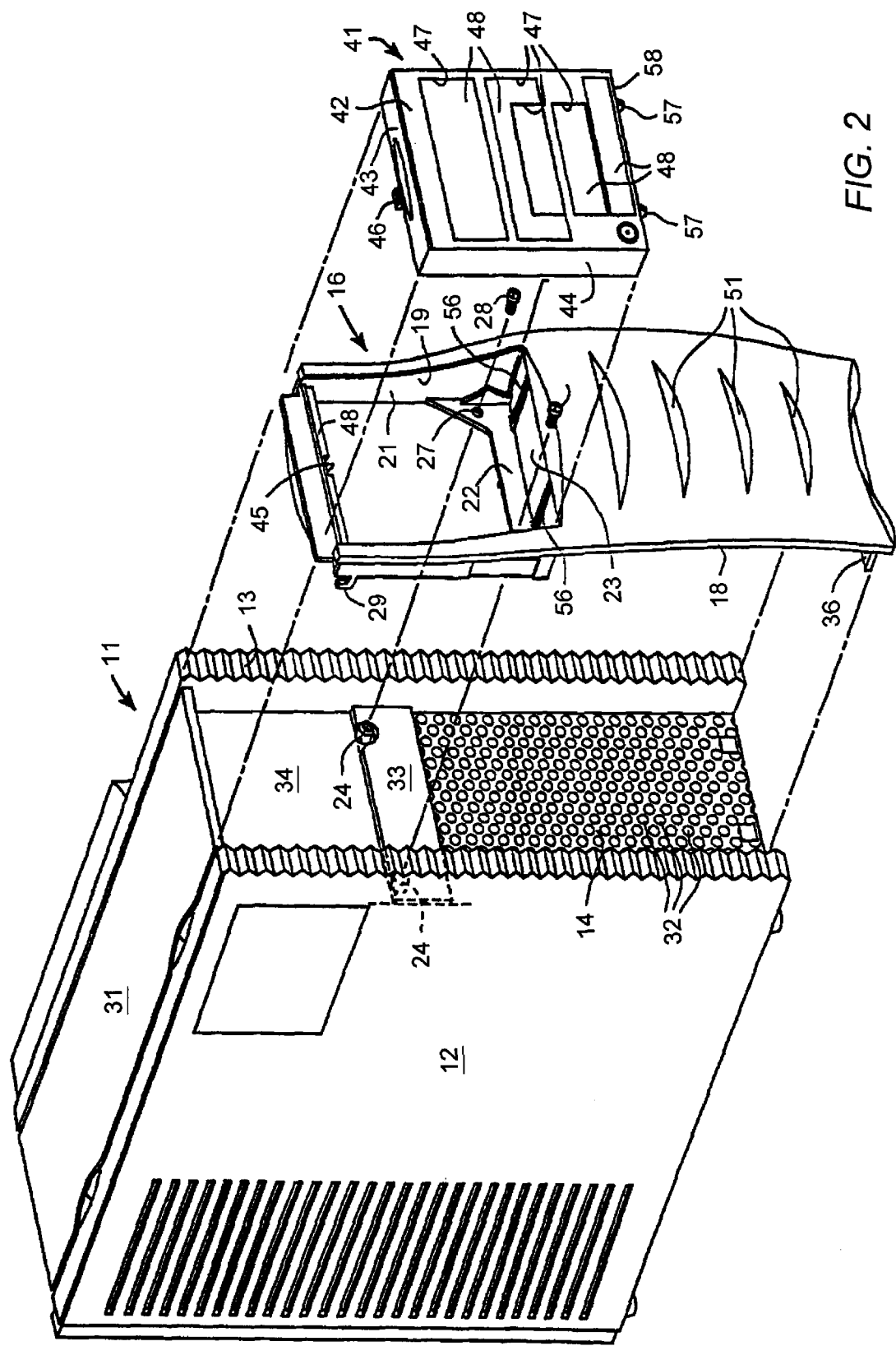
FIG. 2 is an exploded perspective view showing parts of FIG. 1 disassembled.

The front of casing 11 is closed off by front bezel 16 having a front face 17 and outwardly curved side edges 18. When in place, as shown in FIG. 1 there is an opening 15 on either side between edges 13 and 18 through which air may be drawn by a fan (not shown) into the interior of casing 11.

Front grill 14 is formed with perforations 32 at the bottom for passage of air.

Above the perforated portion is a solid portion 33 formed with tapped holes 24. Above solid portion is opening 34.

Adjacent the top of main bezel 16 is opening 19 for a media bezel. Opening 19 is defined by top 20, vertical sides 21 parallel to sides 12, a partial vertical back 22 which closes off a small portion of opening 19 and a horizontal bottom 23. Opening 19 is in substantial alignment with opening 34. Apertures 27 are formed in partial back 22 to receive screws 28 fitting into tapped holes 24. In order to install bezel 16, hooks 29 engage under the front edge of top 31 of casing 11. On the bottom of bezel 16 is a horizontal rearward projecting foot 36 which engages casing 11. Additional hooks 37 engage under the bottom of casing 11. The hooks 29 and 37 hold the bezel in place. The screws 28 hold the bezel in place and reduce vibration. Preferably the bottom of bezel 16 is formed with an upward arch 39 which functions as a finger hold to lift casing 11.

Figure 3A:
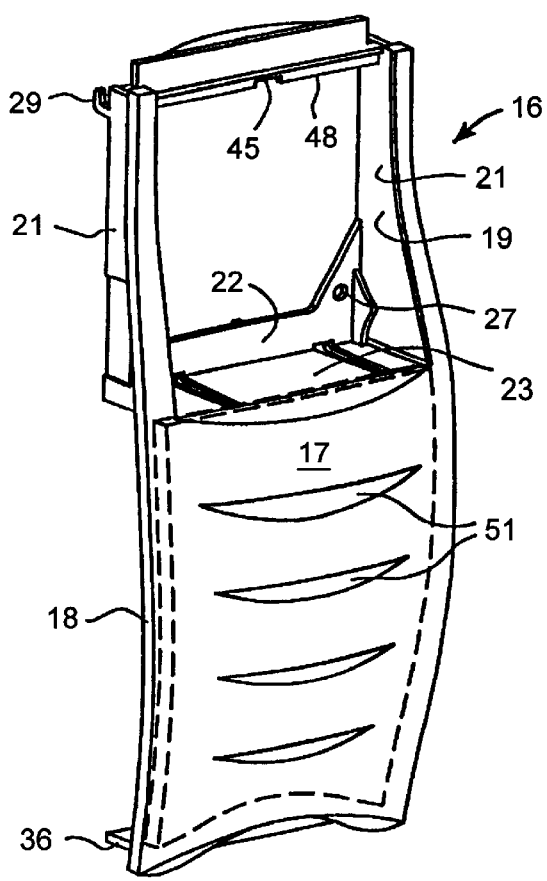
FIG. 3A is a perspective view of the main bezel with the media bezel removed.
Figure 3B:
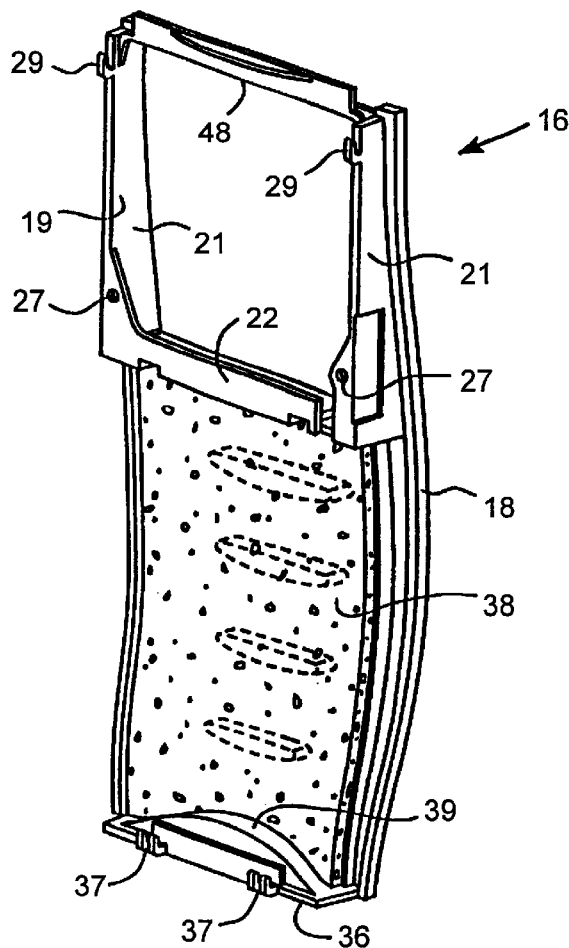
FIG. 3B is a rear perspective view of the structure of FIG. 3A.

Optionally, as shown in FIG. 3B an insulation pad 38 may be formed on the back of bezel 16 for a purpose of heretofore been explained. Pad 38 may be held in place by adhesive (not shown).

A so called "media" bezel 41 closes opening 19. Such a media bezel has a front 42, a top 43 which fits under the top of the opening 19 and sides 44 which fit against the sides 21. Grooves 56 are formed on bottom 23 and mating projections 57 are formed on the bottom 59 of bezel 41. To install media bezel 41, projections 41 are inserted in grooves 56 and bezel 41 is swung backwards and into vertical position. Flexible clip 46 on top 43 engages the top 20 to hold the media bezel in place. Openings 47 are formed in the front 42 of media bezel 41 for insertion of electronic devices, such as disk drives, floppy disks and the like to fit into appropriate brackets within casing 11. Openings 47 which are not in use may be closed by covers 48 held in place by means well known in the art.

As shown, ornamentation 51 may be formed in front face 17. This ornamentation may or may not extend entirely through front 17 as shown. The particular ornamentation shown comprises arcuate grooves 51. However, it will be understood that corporate logos or a variety of other ornamentations may be substituted.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An enclosure combination for electronic components, comprising:
    a casing having a first front casing side edge that is substantially parallel to a second front casing side edge; and
    a main bezel configured to couple to the casing, the main bezel including a bowed front surface and a first side edge that is substantially parallel to a second side edge;
    wherein the bowed front surface of the main bezel allows a portion of the first side edge to form a first opening between the bezel and the casing adjacent the first front casing side edge, wherein the bowed front surface of the main bezel allows a portion of the second side edge to form a second opening between the bezel and the casing adjacent the second front casing side edge, and wherein the first opening and the second opening provide spacing between the casing and the bezel that allows air to be drawn into the casing when the main bezel is coupled to the casing.

2. The combination of claim 1 in which said main bezel has a substantially impervious front face.

3. The combination of claim 1 in which said casing has a support receiving a tapped hole and said main bezel is formed with an opening, a vertical member in said opening and a fastener extending through a hole in said vertical member and into said tapped hole.

4. The combination of claim 1 which further comprises hooks on said main bezel engaging portions of said casing to further secure said main bezel to said casing.

5. The combination of claim 4 in which at least one said hook is located at a top of said main bezel and at least one said hook is located at a bottom of said main bezel.

6. The combination of claim 1 which further comprises a media bezel closing off an opening in the main bezel.

7. The combination of claim 6 which further comprises at least one hook on a top of said media bezel to attach said media bezel to said main bezel.

8. The combination of claim 6 in which said media bezel is formed with a media bezel front having openings for media components including disk drives and floppy disks.

9. The combination of claim 1 in which said casing has a grill spaced rearwardly of said front casing side edges.

10. The combination of claim 9 which said grill is formed with a tapped hole and said main bezel is formed with a partial back overlying said tapped hole.

11. The combination of claim 9, wherein a portion of the grill further comprises perforations.

12. The combination of claim 9, wherein a portion of the grill further comprises an opening suitable for inserting electronic devices.

13. the combination of claim 1 in which said main bezel is formed with a main bezel opening and which further comprises a media bezel fitting into said main bezel opening, said media bezel having a front face substantially coplanar with a front face of said main bezel.

14. The combination of claim 1 in which said main bezel having a back and a front opening further comprises an acoustic insulation pad on said back below said front opening.

15. The combination of claim 14, wherein the acoustic insulation pad is attached to the back of the main bezel by adhesive.

16. The combination of claim 1, wherein portions of the main bezel sides are outwardly curved to form at least two substantial side openings between the casing and the main bezel through which air may circulate relative to said casing.

17. The combination of claim 1, wherein the main bezel further comprises a bottom side having an upward arch functioning as a finger hold.

18. The combination of claim 1, wherein the front casing side edges have a non-planar contour.

19. The combination of claim 1, wherein the main bezel further comprises ornamentation arranged on a front surface of the main bezel.

20. The combination of claim 19 wherein the ornamentation further comprises arcuate grooves extending laterally through a portion of the main bezel.

* * * * *